(12) United States Patent
Neuhofer

(10) Patent No.: US 9,546,487 B2
(45) Date of Patent: Jan. 17, 2017

(54) DEVICE FOR FASTENING A CEILING PROFILE

(71) Applicant: Franz Neuhofer, Zell am Moos (AT)

(72) Inventor: Franz Neuhofer, Zell am Moos (AT)

( * ) Notice: Subject to any disclaimer, the term of this patent is extended or adjusted under 35 U.S.C. 154(b) by 0 days.

(21) Appl. No.: 14/420,766

(22) PCT Filed: Feb. 11, 2014

(86) PCT No.: PCT/AT2014/050038
§ 371 (c)(1),
(2) Date: Feb. 10, 2015

(87) PCT Pub. No.: WO2014/146153
PCT Pub. Date: Sep. 25, 2014

(65) Prior Publication Data
US 2015/0233404 A1   Aug. 20, 2015

(30) Foreign Application Priority Data

Mar. 21, 2013   (AT) .............................. A 50194/2013

(51) Int. Cl.
*E04F 19/04*   (2006.01)
*F16B 5/12*   (2006.01)
(Continued)

(52) U.S. Cl.
CPC ........... *E04F 19/0436* (2013.01); *E04F 19/04* (2013.01); *E04F 19/0463* (2013.01);
(Continued)

(58) Field of Classification Search
CPC ............... E04F 19/0436; E04F 19/0468; E04F 19/0463; E04F 2019/0422; E04F 19/04; Y10T 24/303; Y10T 24/309; F16B 5/123; F16B 5/0685

See application file for complete search history.

(56) References Cited

U.S. PATENT DOCUMENTS 5,001,877 A * 3/1991 Edwards .................. B44C 5/00
                                                    403/295
5,274,972 A * 1/1994 Hansen .................. E04F 17/08
                                                    174/504
(Continued)

FOREIGN PATENT DOCUMENTS

AT   EP 0608208 A1 *   7/1994   .......... E04F 19/0463
DE   199 17 612 A1     2/2000
(Continued)

OTHER PUBLICATIONS

International Search Report of PCT/AT2014/050038, mailed Jul. 4, 2014.

*Primary Examiner* — Eret McNichols
(74) *Attorney, Agent, or Firm* — Collard & Roe, P.C.

(57) ABSTRACT

A device is described for fastening a ceiling profile (8) for the transition between a wall (9) and a ceiling (10) having a holder (1), which has a wall leg (2) and two holding webs (6), which engage in longitudinal grooves (7) of the ceiling profile (8). To provide simple structural conditions, it is proposed that the holder (1) forms a plastic profile having a carrying leg (3) which protrudes downward from the wall leg (2) at an acute angle, and having a support leg (4) which connects the wall leg (2) on top to the carrying leg (3), the holding legs (6) extending transversely to the wall leg (2) protrude from the carrying leg (3), and the carrying leg (3) is extended beyond the support leg (4) to form a springy catch hook (14), which interacts with a catch stop (16) of the ceiling profile (8).

5 Claims, 3 Drawing Sheets

(51) Int. Cl.
*F16B 5/02* (2006.01)
*F16B 5/06* (2006.01)

(52) U.S. Cl.
CPC ............ *E04F 19/0468* (2013.01); *F16B 5/02* (2013.01); *F16B 5/0685* (2013.01); *F16B 5/123* (2013.01); *E04F 2019/0422* (2013.01); *Y10T 24/303* (2015.01); *Y10T 24/309* (2015.01)

(56) References Cited

U.S. PATENT DOCUMENTS

| | | | | |
|---|---|---|---|---|
| 5,359,817 A * | 11/1994 | Fulton | ............... | E04F 19/026 52/288.1 |
| 5,433,048 A * | 7/1995 | Strasser | ............ | E04F 19/0436 52/288.1 |
| 5,651,224 A * | 7/1997 | Brabant | ............ | E04F 19/0436 52/288.1 |
| 5,662,753 A * | 9/1997 | Loos | ............... | E04F 19/0436 156/71 |
| 5,711,123 A * | 1/1998 | Lamont | ............ | E04F 19/02 40/650 |
| 6,557,311 B1 * | 5/2003 | Mongelli | ........... | E04F 19/0436 52/288.1 |
| 6,643,987 B2 * | 11/2003 | Rusch | ............ | E04F 19/04 24/287 |
| 8,171,698 B2 * | 5/2012 | Neuhofer | .......... | E04F 19/0468 52/287.1 |
| 8,534,016 B2 * | 9/2013 | DePaul | ............ | E04F 19/0436 52/288.1 |
| 8,779,290 B1 * | 7/2014 | DePaul | ............ | H02G 3/0431 174/68.3 |
| 9,027,299 B2 * | 5/2015 | Mea | ............... | E04F 19/0436 52/288.1 |
| 2008/0034688 A1 * | 2/2008 | Neuhofer, Jr. | .... | E04F 15/02027 52/290 |
| 2009/0151134 A1 | 6/2009 | Neuhofer, Jr. | | |
| 2010/0242389 A1 * | 9/2010 | DePaul | ............ | E04F 19/0436 52/288.1 |

FOREIGN PATENT DOCUMENTS

| | | | | |
|---|---|---|---|---|
| DE | 101 07 866 A1 | | 9/2001 | |
| DE | 10211858 A1 | * | 9/2003 | .......... E04F 19/0436 |
| GB | 1186222 A | * | 4/1970 | ............. E04F 19/04 |
| GB | WO 9706389 A1 | * | 2/1997 | .......... E04F 19/0436 |
| PL | WO 2014158041 A1 | * | 10/2014 | .......... E04F 19/0463 |
| WO | 2007/062446 A1 | | 6/2007 | |

* cited by examiner

DEVICE FOR FASTENING A CEILING PROFILE

CROSS REFERENCE TO RELATED APPLICATIONS

This application is the National Stage of PCT/AT2014/050038 filed on Feb. 11, 2014, which claims priority under 35 U.S.C. §119 of Austrian Application No. A 50194/2013 filed on Mar. 21, 2013, the disclosure of which is incorporated by reference. The international application under PCT article 21(2) was not published in English.

FIELD OF THE INVENTION

The invention relates to a device for fastening a ceiling profile for the transition between a wall and a ceiling having a holder, which has a wall leg and two holding webs engaging in longitudinal grooves of the ceiling profile.

DESCRIPTION OF THE PRIOR ART

To be able to solidly clamp ceiling profiles in the transition between a wall and a ceiling in a simple manner, providing a holder having a wall leg fastenable on the wall, which has two clamping webs protruding toward the ceiling profile, which engage with an opposing springy contact in longitudinal grooves of the ceiling profile, so that the ceiling profile is fixedly held between the two springy clamping webs, is known (WO 2007/062446 A1). The condition for good mounting of the ceiling profile is that a sufficient clamping force can also be maintained over long periods of time, which generally requires the use of spring steel for the holders, because the required clamping forces can hardly be applied, at least not over longer periods of time, using holders made of a plastic profile.

SUMMARY OF THE INVENTION

The invention is therefore based on the object of embodying a device for fastening a ceiling profile in the transition between a wall and a ceiling so that holders made of plastic can be used without endangering a permanent, secure mounting of the ceiling profiles.

Proceeding from a device of the type mentioned at the outset, the invention achieves the stated object in that the holder forms a plastic profile having a carrying leg, which protrudes downward from the wall leg at an acute angle, and having a support leg, which connects the wall leg on top to the carrying leg, holding legs, which extend transversely to the wall leg, protrude from the carrying leg, and the carrying leg is extended beyond the support leg to form a springy catch hook which interacts with a catch stop of the ceiling profile.

Due to the closing of the wall leg and the carrying leg via a support leg to form a hollow plastic profile, primarily sufficient strength for the holder is ensured to be able to dissipate onto the wall the loads to be absorbed via the holding webs attached to the carrying leg. The ceiling profile is pushed transversely to its longitudinal direction onto the holding webs which extend transversely, preferably in parallel to the wall leg, wherein the holding legs engage in the longitudinal grooves of the ceiling profile provided for this purpose. The ceiling profile is therefore held in the vertical direction, but is not secured from being pulled off of the holding legs transversely to the wall leg. For this reason, the carrying leg is extended beyond the support leg to form a springy catch hook, which engages behind a catch stop of the ceiling profile when the ceiling profile is pushed onto the holding webs, so that the ceiling profile can no longer be unintentionally detached from the holder. Since as a result of these measures, the mounting of the ceiling profile is not performed by a clamping action and the securing in location of the ceiling profile on the plastic profile of the holder is performed via a catch hook which interacts with a catch stop of the ceiling profile, the durable-elastic properties of the plastic profile of the holder do not play a role for the mounting of the ceiling profile. The mounting of the ceiling profile is therefore independent of appearances of aging of the plastic profile. The springy properties of the catch hook are only used for the purpose of securing engagement behind the catch stop like a catch closure. No spring force is necessary in the stop position.

To secure the contact of the ceiling profile both on the wall and also on the ceiling, the wall leg of the holder is to be fastened on the wall at a predefined vertical distance from the ceiling. If the support leg forms a ceiling stop in the form of a roof-like angling, this vertical distance is thus structurally predefined by the support leg forming a ceiling stop. The roof-like angling of the support leg takes into consideration the circumstance in this case that a fillet is generally to be expected in the transition region from the wall to the ceiling.

Various possibilities result for the wall fastening of the holder. The wall leg can thus have a fastening attachment on at least one side, by which the plastic profile of the holder can be fixedly screwed onto the wall. With the preferable provision of two lateral fastening attachments, an inclination of the plastic profile about the axis of the fastening screw is prevented. Another possibility for fastening the holder results if the wall leg has a passage opening for a fastening screw accessible through a passage in the carrying leg. In this case, a predefined rotational position about the axis of the fastening screw can be secured solely via a ceiling stop. This also applies for an embodiment in which the carrying leg and the support leg form two bows, which leave open the passage for the fastening screw between them. The rotational securing for the holder only receives installation significance in consideration of the circumstance, however, that the ceiling profile plugged onto the holding webs necessarily experiences a rotationally-fixed support in relation to the ceiling.

BRIEF DESCRIPTION OF THE DRAWING

The subject matter of the invention is illustrated as an example in the drawing.

In the figures

DESCRIPTION OF THE PREFERRED EMBODIMENT

Figure 1:
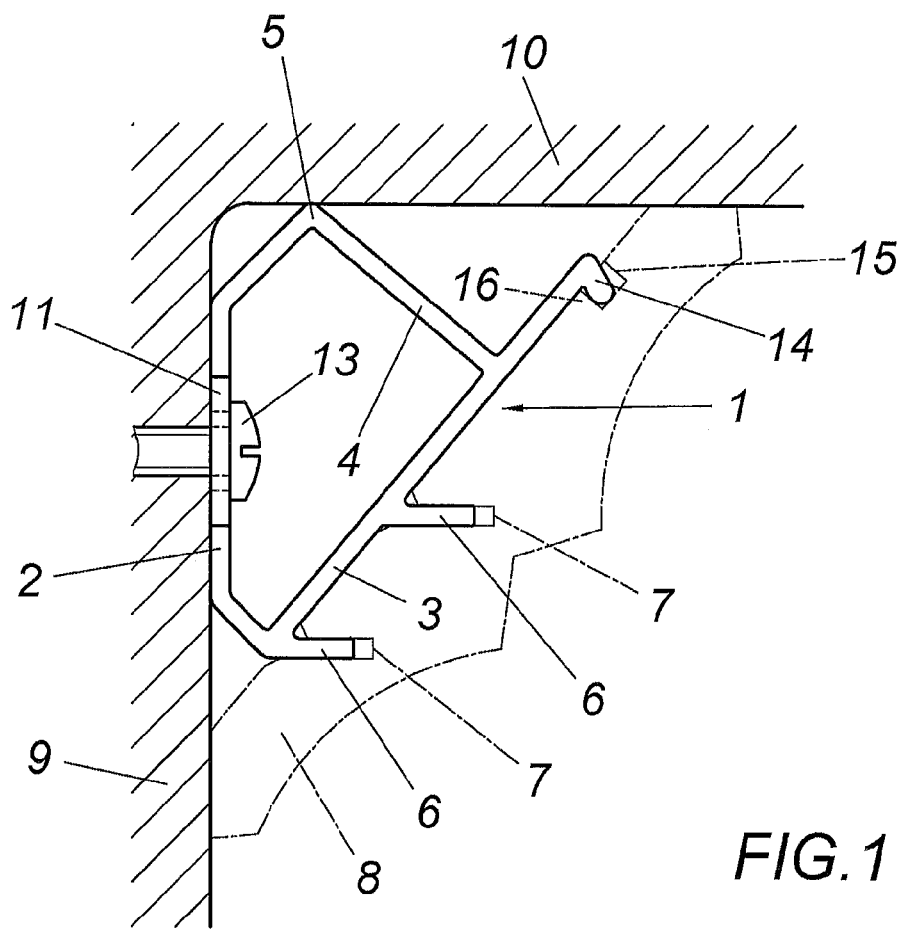
FIG. 1 shows a device according to the invention for fastening a ceiling profile in the transition between a wall and a ceiling in a simplified side view.
Figure 2:
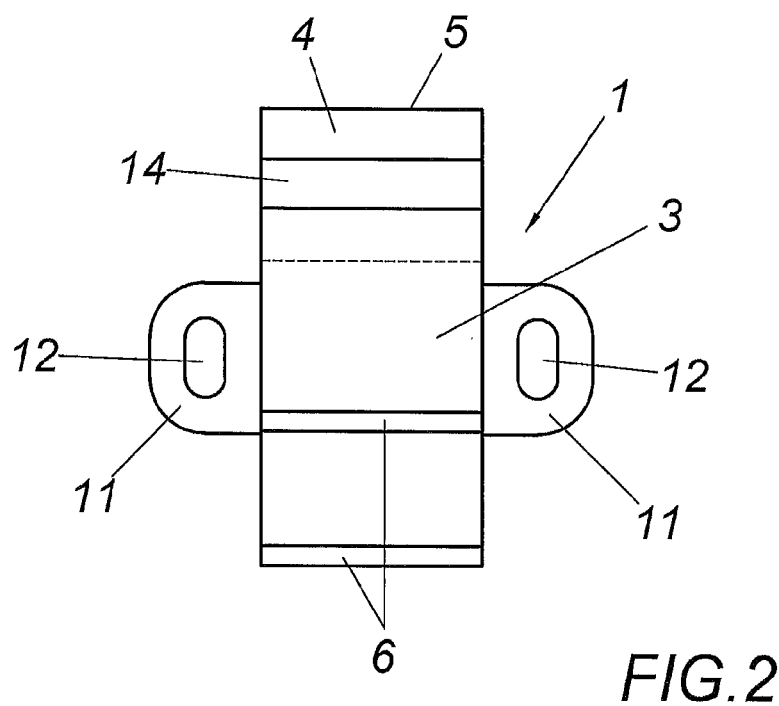
FIG. 2 shows the holder according to FIG. 1 in a front view.

The fastening device according to the exemplary embodiment as shown in FIGS. 1 and 2 comprises a holder 1 made of a plastic profile, which forms a wall leg 2 and a carrying leg 3, which protrudes downward from the wall leg 2 at an acute angle and which is connected at the top to the wall leg 2 via a support leg 4 to form a hollow profile. The support leg 4 has the shape of a roof-like angling to form a ceiling stop 5, as can be inferred from FIG. 1. Two parallel holding webs 6, which are aligned transversely to the wall leg 2, protrude from the carrying leg 3, these holding webs engaging in longitudinal grooves 7 of a ceiling profile 8, which is indicated by dot-dash lines.

For fastening the holder 1 in the transition region between a wall 9 and a ceiling 10, the wall leg 2 is provided with two lateral fastening attachments 11, which form passage holes 12 for fastening screws 13, so that the holder 1 can be fixedly screwed onto the wall 9 corresponding to FIG. 1 so that the holder 1 presses via the ceiling stop 5 on the ceiling 10. The ceiling profile 8 is installed with the pushing of the ceiling profile 8 onto the holding webs 6 transversely to the longitudinal direction of the ceiling profile 8. The holding webs 6 fixedly hold the ceiling profile 8 in the vertical direction. However, securing in relation to unintentional pulling of the ceiling profile 8 off of the holding webs 6 must additionally be ensured. For this purpose, the carrying leg 3 is extended beyond the support leg 4 to form a springy catch hook 14, which interacts with a catch stop 16 of the ceiling profile 8, which is formed by a longitudinal groove 15, and engages behind the catch stop 16 like a snap closure when the ceiling profile 8 is pushed onto the holding webs 6.

Figure 3:
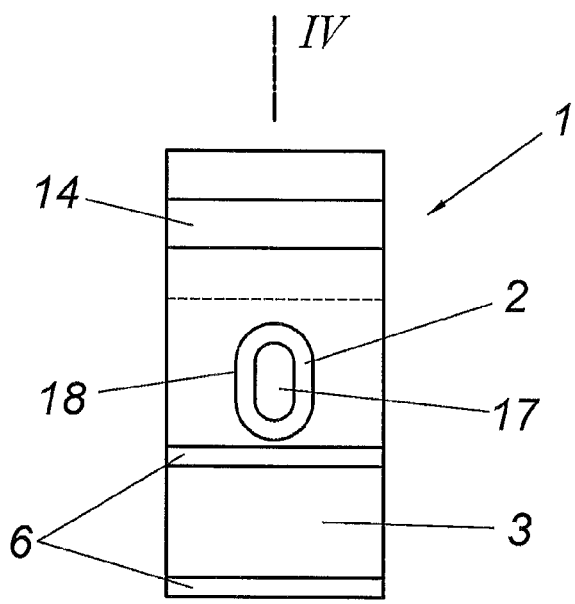
FIG. 3 shows an embodiment variant of a holder according to the invention in a front view corresponding to FIG. 2.
Figure 4:
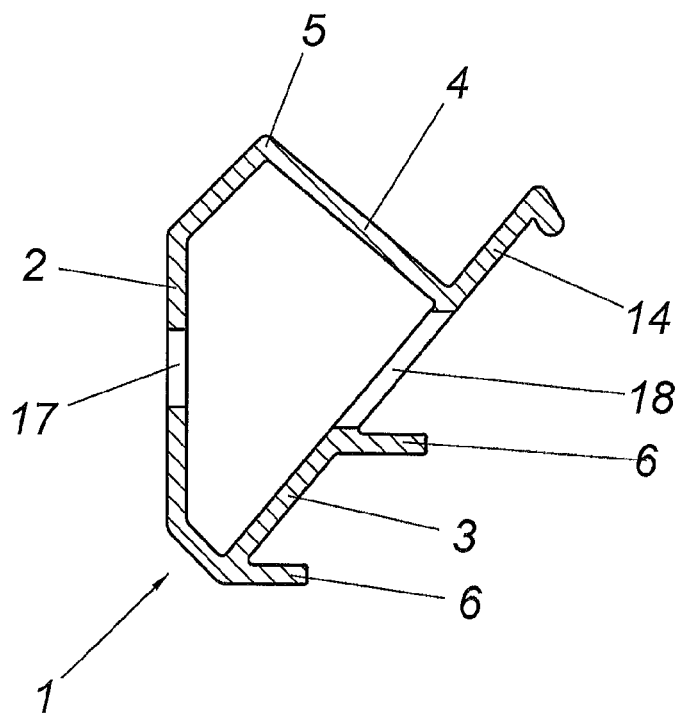
FIG. 4 shows the holder according to FIG. 3 in a section along line IV-IV of FIG. 3.

For differentiation from the exemplary embodiment according to FIGS. 1 and 2, the holder 1 according to FIGS. 3 and 4 does not have lateral fastening attachments 11. Rather, the fastening of the holder 1 is takes place via a passage opening 17 in the wall leg 2 of the holder 1. The access to a fastening screw is achieved in this case by a correspondingly large passage 18 in the carrying leg 3.

Figure 5:
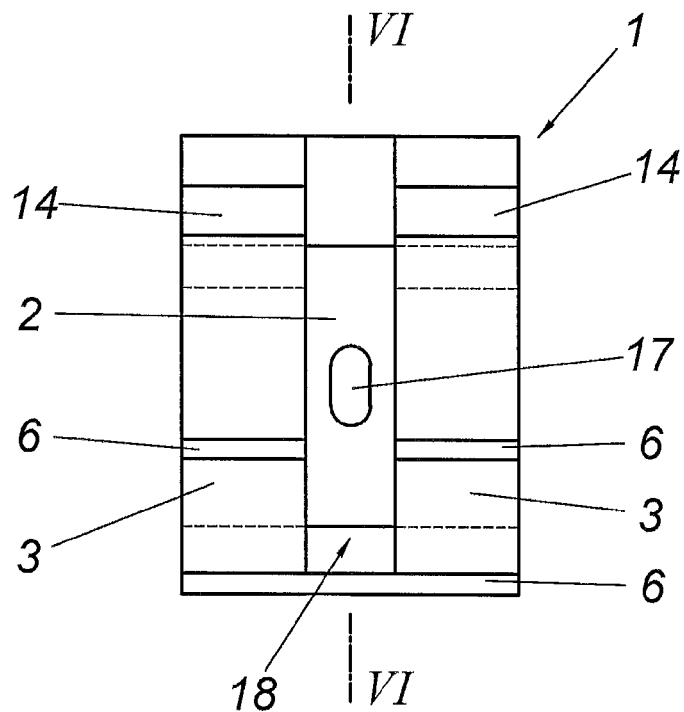
FIG. 5 shows an illustration corresponding to FIG. 3 of a further design variant of a holder according to the invention.
Figure 6:
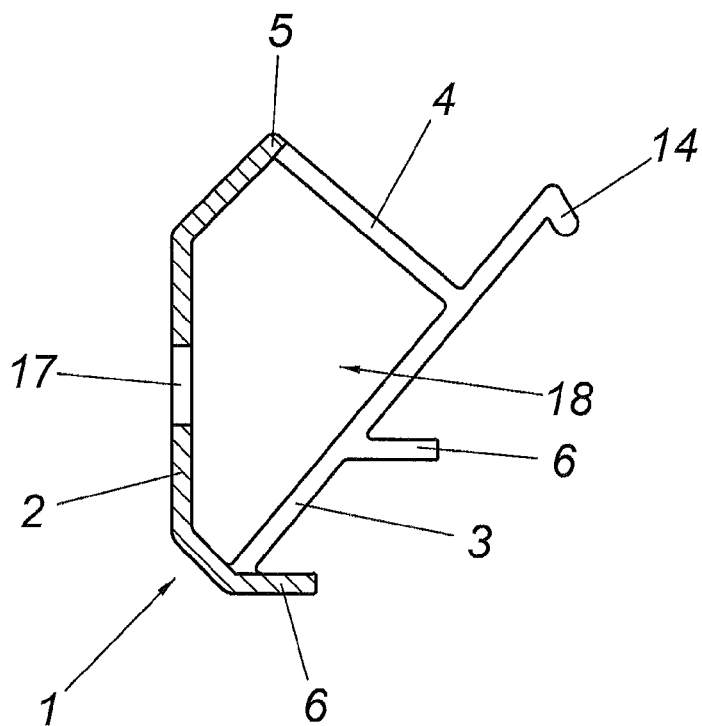
FIG. 6 shows the holder according to FIG. 5 in a section along line VI-VI of FIG. 5.

A further embodiment variant is shown in FIGS. 5 and 6. In this exemplary embodiment, the wall leg 2 also has a passage opening 17 for a fastening screw, but in contrast to FIGS. 3 and 4, the carrying leg 3 and the support leg 4 form two bows which leave open the passage 18 between them, so that fastening screw which penetrates the passage opening 17 in the wall leg 2 is accessible through the free passage 18 between the bows.

The invention claimed is:

1. A device for fastening a ceiling profile for the transition between a wall and a ceiling, the device having a holder forming a plastic profile, the holder having a wall leg, two holding webs, a carrying leg, and a support leg,
   wherein the two holding webs engage in longitudinal grooves of the ceiling profile,
   wherein the carrying leg begins at and protrudes downward from the wall leg at an acute angle,
   wherein the support leg connects the wall leg on top to the carrying leg,
   wherein the holding webs extend transversely to the wall leg and begin at and protrude from the carrying leg, and
   wherein the carrying leg is extended beyond the support leg to form a springy catch hook, which interacts with a catch stop of the ceiling profile.

2. The device according to claim 1, wherein the support leg forms an angled ceiling stop.

3. The device according to claim 1, wherein the wall leg has a fastening attachment on at least one side.

4. The device according to claim 1, wherein the wall leg has a passage opening for a fastening through accessible through a passage in the carrying leg.

5. The device according to claim 4, wherein the carrying leg and the support leg form two bows, which leave open the passage for the fastening screw between them.

\* \* \* \* \*